(12) United States Patent
Meany et al.

(10) Patent No.: US 10,410,043 B2
(45) Date of Patent: Sep. 10, 2019

(54) SYSTEM AND METHOD FOR PART IDENTIFICATION USING 3D IMAGING

(71) Applicant: Skusub LLC, Las Vegas, NV (US)

(72) Inventors: Keith H. Meany, Charleston, SC (US); Matthew Antone, Winchester, MA (US)

(73) Assignee: Skusub LLC, Las Vegas, NV (US)

( * ) Notice: Subject to any disclaimer, the term of this patent is extended or adjusted under 35 U.S.C. 154(b) by 0 days.

(21) Appl. No.: 15/350,003

(22) Filed: Nov. 11, 2016

(65) Prior Publication Data

US 2017/0372127 A1    Dec. 28, 2017

Related U.S. Application Data

(60) Provisional application No. 62/354,603, filed on Jun. 24, 2016.

(51) Int. Cl.
| | |
|---|---|
| *G06K 9/00* | (2006.01) |
| *G06K 9/62* | (2006.01) |
| *G06Q 30/06* | (2012.01) |
| *G06F 16/951* | (2019.01) |
| *G06F 16/583* | (2019.01) |
| *G06T 17/00* | (2006.01) |
| *G06F 16/532* | (2019.01) |

(52) U.S. Cl.
CPC ....... *G06K 9/00214* (2013.01); *G06F 16/532* (2019.01); *G06F 16/5838* (2019.01); *G06F 16/951* (2019.01); *G06K 9/6215* (2013.01); *G06Q 30/0625* (2013.01); *G06Q 30/0643* (2013.01); *G06T 17/00* (2013.01); *G06T 2200/04* (2013.01)

(58) Field of Classification Search
None
See application file for complete search history.

(56) References Cited

U.S. PATENT DOCUMENTS

| | | | | |
|---|---|---|---|---|
| 6,968,075 | B1* | 11/2005 | Chang | G06K 9/00214 382/111 |
| 9,390,315 | B1* | 7/2016 | Yalniz | G06K 9/4609 |
| 9,424,461 | B1* | 8/2016 | Yuan | G06K 9/00201 |
| 2004/0086203 | A1* | 5/2004 | Furuhashi | G06K 9/6217 382/305 |
| 2005/0157931 | A1* | 7/2005 | Delashmit, Jr. | G06K 9/00208 382/190 |
| 2006/0012597 | A1* | 1/2006 | Chakraborty | G06K 9/00214 345/419 |
| 2011/0235897 | A1* | 9/2011 | Watanabe | G06K 9/00214 382/154 |
| 2011/0273442 | A1* | 11/2011 | Drost | G06K 9/00214 345/419 |
| 2013/0258117 | A1* | 10/2013 | Penov | G06K 9/6202 348/207.1 |

(Continued)

*Primary Examiner* — Ryan P Potts
(74) *Attorney, Agent, or Firm* — Kajane McManus

(57) ABSTRACT

The system and method deal with three-dimensional (3D) scanning technology which produces object representations which permit rapid, highly-accurate part identification which is not afforded by traditional two-dimensional (2D) camera imaging. The system and method are applicable to any field wherein repair/replacement parts are needed, such as the plumbing, automotive, fastener, marine, window, door, etc. fields.

9 Claims, 7 Drawing Sheets

(56) References Cited

U.S. PATENT DOCUMENTS

| | | | |
|---|---|---|---|
| 2014/0098094 A1* | 4/2014 | Neumann | G06T 17/10 345/420 |
| 2014/0244433 A1* | 8/2014 | Cruz | G06Q 30/0633 705/26.8 |
| 2015/0016712 A1* | 1/2015 | Rhoads | G06K 9/00208 382/154 |
| 2015/0023602 A1* | 1/2015 | Wnuk | G06K 9/00671 382/190 |
| 2016/0071318 A1* | 3/2016 | Lee | G06T 17/00 345/419 |

* cited by examiner

SYSTEM AND METHOD FOR PART IDENTIFICATION USING 3D IMAGING

CROSS REFERENCE TO RELATED APPLICATIONS

This application claims priority from U.S. Provisional Patent Application No. 62/354,603 filed on Jun. 24, 2016, of the same title, the content of which is incorporated herein in its entirety, by reference.

BACKGROUND OF THE INVENTION

Field of the Invention

The present invention deals with three-dimensional (3D) scanning technology which produces object representations which permit rapid, highly-accurate part identification which is not afforded by traditional two-dimensional (2D) camera imaging.

Prior Art

Parts replacement is a huge business, and an automated approach to identification is long overdue. Almost every industry today shares the common problem of maintaining repair parts for rapidly expanding product lines. Products are constantly changing; for instance, becoming more energy efficient, more current in fashion trends, or more technologically advanced. Over time, the ability to identify and repair specific product lines has become increasingly difficult. Each new line adds a multitude of replacement parts to a seemingly endless list that continues to accumulate for decades. The sheer volume of information is often overwhelming for all but the most expert individuals in a particular field. Only such experts possess the knowledge and experience necessary to identify these parts, and obtaining that knowledge requires years or decades of exposure to the lines. Parts identification has thus largely become a lost art, which has led large retailers to only attempt identification of the most common and readily available items.

A prime example of these trends is found in the plumbing parts industry. An active plumbing parts market began in the 1920s as residential plumbing became commonplace. Originally plumbing manufacturing was a localized industry, but over time some brands grew to be regional and national, dramatically increasing the number of fixtures in the field and, in turn, the difficulty of parts identification. As product lines have evolved, many manufacturers have failed to keep track of their own parts for discontinued lines. Furthermore, in the past two decades, imported products sold through home centers have flooded the market; these fixtures have virtually no manufacturer support in terms of parts identification nor inventory. Finally, because the plumbing industry has become a fashion industry, entire product lines can change at the whim of fashion trends, compounding the difficulty of parts identification further. Some manufacturers still maintain some of their obsolete parts, and non-OEM manufacturers have replaced many thousands of discontinued items. As a result, today there are decades of parts available, but average consumers and distributors have no way of identifying these parts quickly and accurately. In the present exemplary method, a massive cross-referenced database of thousands of plumbing repair parts has been created, but even this database is so massive that only an expert can sift through it efficiently.

A number of recognition methods have been developed that rely solely on images both for off-line database models and for online recognition with a few significant differences from that proposed herein. Firstly, the presently available systems capture only a two-dimensional (2D) projection of an object, with no depth information. The third dimension must be inferred indirectly, for instance by using a very large number of photographs at different angles to train each object type, or is not used at all, severely limiting performance. In addition to lacking depth, 2D projections also carry no notion of absolute scale, meaning that it is impossible to determine the true physical dimensions of an object solely from images in meaningful real-world units such as inches or millimeters. There is an inherent ambiguity that couples the actual object size with its distance from the camera; i.e., a part that is twice as large imaged from twice as far away will look the same in a photograph, and thus cannot be distinguished.

Secondly, the appearance of objects in photographs is subject to many external and uncontrolled factors that can dramatically alter measurements from one image to another, and thus makes recognition even more challenging. Environmental lighting causes reflections and glare, casts shadows, and changes the apparent color and lightness of object surfaces. Radiometric characteristics of the imager itself, including color response curves of the photodetector, white balance and gain adjustments, aperture and shutter settings, focus, etc., also affect object appearance, sharpness, and color. The perspective and distance from which an object is viewed, along with geometric lens properties of a camera used in taking the photographs, can distort the object's visible shape, vary its appearance, and cause self-occlusions that differ from image to image.

Two 2D parts recognition solutions currently available are provided by:
PartPic
75 5th St. NW Suite 2240
Atlanta, Ga. 30308
partpic.com/and
FindBox
BundesstraBe 16
77955 Ettenheim
findbox.de/en The exemplary 3D part recognition system of the present invention allows for quicker, and far more accurate product identification than afforded by 2D scanning, with minimal user training.

With respect to data acquisition, non-contact 3D scanners fall into two broad categories: passive sensing, such as binocular stereoscopic vision or monocular structure-from-motion, which uses only cameras; and active sensing, projecting light onto scanned objects and measuring the response with a camera to infer depth. Active scanners can be further partitioned into two subcategories:

1. Time of flight. Pulses of light are generated by an emitter, and a photodetector or camera measures the phase shift and thus the time taken for the pulse to travel to the object and return. This time is directly proportional to the distance from the emitter to the scanned surface, allowing range values to be easily computed. Line scan ranging devices use a single laser beam combined with a spinning mirror, and thus only measure a single bearing range pair at each sample, while area-pulsed devices use a broader wave front and thus can measure range over an entire photodetector array at once.

2. Structured light. A projector, typically a laser diode or digital light processing (DLP) device, emits a known pattern of light, such as a stripe, dot array, or fringe pattern, that illuminates the scanned object's surface. A precisely calibrated camera records the reflection of this pattern, and the degree of measured geometric deformation of the pattern allows calculation of the surface's shape.

Raw output formats of individual scans include bearing range sequences, depth images, and point clouds. Most scanning systems also allow placing the scanned object on a turntable, or physically moving the sensor around the object, to collect multiple scans so that all surfaces are visible. Software can then automatically "stitch" the different views together into a single coherent model, which can be exported to a variety of standard formats, including regularly sampled 3D point clouds or watertight meshes consisting of vertices and triangles. Red-green-blue (RGB) color values from the scanner's imager can also be assigned to each point or mesh vertex to form texture maps that encode the visible appearance of the object's surfaces. Under controlled conditions, high quality scanners produce very detailed 360 degree object models with sub-millimeter resolution, precisely capturing even very fine scale features such as screw threading and surface embossing. Furthermore, models can be acquired very quickly, especially by area pattern structured light scanners that image large portions of the object's surface simultaneously. These qualities make 3D scanning viable for large scale parts database acquisition and for discriminating between multiple parts with subtle shape differences.

With respect to part identification via 3D scans, a number of methods have been developed in the scientific literature for recognizing objects based on their 3D shape. A prototypical object recognition system operates in two phases:

A.1. Training. This is an offline process and is only required when new object models (or part SKUs) are added. The recognition system is fed a series of well-curated, labeled scans of the objects to be recognized, and accesses or "learns" a database that associates each object label with a summary representation or model of that object, such as spatial dimensions, 3D point clouds, or set of local geometric descriptors.

A.2. Query. This is an online process that is invoked whenever an unknown object or part is to be recognized. The system converts a 3D scan of the "query" object into a summary representation commensurate with that stored in the training database. The method then proceeds to determine a score, or degree of similarity, between the query object and each of the learned models in the database. The system then reports an ordered list of the top matching labels and their associated scores.

B. Two key factors in recognition system performance are object representation (i.e features) and matching criteria (i.e. method by which features are compared). There are several broad choices for recognition strategies, including:

B.1. Hierarchical. A cascaded series of simple, rapidly-computed attributes such as size and shape that partition the database into a tree-like structure. Within each level of the tree is a finer degree of specificity. This permits very efficient query even with a very large number of models.

B.2. Holistic. The entire object, for instance in the form of a point cloud, is geometrically matched against each model in the database in an exhaustive fashion. This method works best for rigid, non-articulated object types, and while highly accurate, can be somewhat slow and dependent on precise object-to-object alignment.

B.3. Feature-based. A set of local geometric descriptors is computed for each object model and for the query object in the form of multidimensional feature vectors with associated 3D spatial locations. The feature vectors extracted from the query object are compared to those extracted from the database models, with geometric consistency criteria applied across the set of feature matches. This method is very fast and exhibits robustness to missing information, clutter, and misalignment.

Aspects of these strategies may also be combined in various ways to achieve desired levels of accuracy and speed. Matching methods work best when (1) objects to be recognized have predictable shape, (2) scans are of high quality and detail, (3) objects are scanned in isolation from other objects and background clutter, and (4) objects are in approximately known orientation when scanned. Under benign and controlled conditions, recognition rates can exceed 99% accuracy with very few false positives, even for large model databases. The degree of geometric similarity between models in the database is also an important factor in how reliably objects can be distinguished from one another, and the number of different models determines the speed with which results can be generated.

It will be understood that many industries, such as plumbing, automotive, fastener, marine, window and door, etc., have continually growing product lines, and as new models flood the market, the inventory of repair and replacement parts continues to grow as well. Personnel with the expertise required to identify parts across an entire discipline are increasingly rare, since acquiring this knowledge requires decades of experience. As a result, large retail stores like Lowes, Home Depot, Ace Hardware, etc. teach their personnel "Priority Parts Identification" only; these are items that are most frequently requested at the store.

SUMMARY OF THE INVENTION

The object recognition approach of the present invention relating to part identification involves four main components.

A. DATABASE: A comprehensive catalog consisting of 3D object scans is created a-priori for training and analyzed by the system to produce digital feature models. These models form the reference database used by the system to recognize query objects.

B. USER-BASED SCANNING: End users scan unknown objects or parts with any electronic instrument—such as their own mobile device capable of 3D imaging or a dedicated 3D scanner installed at a retail location—to form queries. A query scan is then analyzed by the system to produce a digital profile compatible with the database.

C. MATCHING SYSTEM: A computerized computation system compares features in the query profile with features in the database via hierarchical, holistic, and/or feature-based methods. Candidate matches are ranked according to a score value.

D. DATA PRESENTATION: Ranked match results, along with part numbers, images, and other descriptive information, can be displayed to the user (e.g., for online order fulfillment). Results can also be routed to various other back end services for further processing, analytics, or visual search.

In the Plumbing section, for instance, Priority Parts are typically stems and cartridges. Most retail stores maintain inventory and are able to readily identify approximately 100 stems and cartridges at any given time, but more than 2,000 different types actually exist. It has proven nearly impossible for stores and wholesalers to maintain personnel with the requisite expertise to identify these additional 1,900 items, so most locations do not carry inventory other than the Priority Parts. As a result, the consumer is often left unsatisfied, or even forced to buy an entirely new fixture, which is both expensive and wasteful.

The present recognition system will solve these problems by allowing store employees and consumers to quickly and automatically identify unknown parts with no prior product-specific experience. The system will accommodate a variety of user-based scanning methods, including 3D scanners placed in retail stores, consumer-grade depth cameras emerging on mobile phones, etc. The part databases will be comprehensive, containing both common and rare items, so that identification and fulfillment do not depend on particular inventory or experience that happens to be on hand. Users will simply place a part of interest in front of the scanner, and the system will efficiently provide a ranked list of most likely catalog part matches.

With respect to advantages of the system and method of the present invention, 3D scanners overcome nearly all of the shortcomings of existing image-based solutions by measuring an object's surfaces directly. They recover object shape and true size in all three dimensions simultaneously, with no ambiguities arising from distance, viewpoint, lighting, or occlusion. Because 3D scanners measure true, objective properties (physical distance) rather than apparent, subjective properties (projection and reflectance), they produce inherently more reliable observations that can be meaningfully compared for much more accurate object recognition. Furthermore, building large databases is a more straightforward process, requiring fewer observations of each object type, and models can even be obtained through other means such as CAD drawings.

The use of 3D scanners thus affords the system significant advantages in terms of accuracy and efficiency, which allow for the building of the parts databases much more quickly, and allow parts to be recognized much more easily and effectively, than existing solutions.

DESCRIPTION OF THE PREFERRED EMBODIMENT

Figure 1:
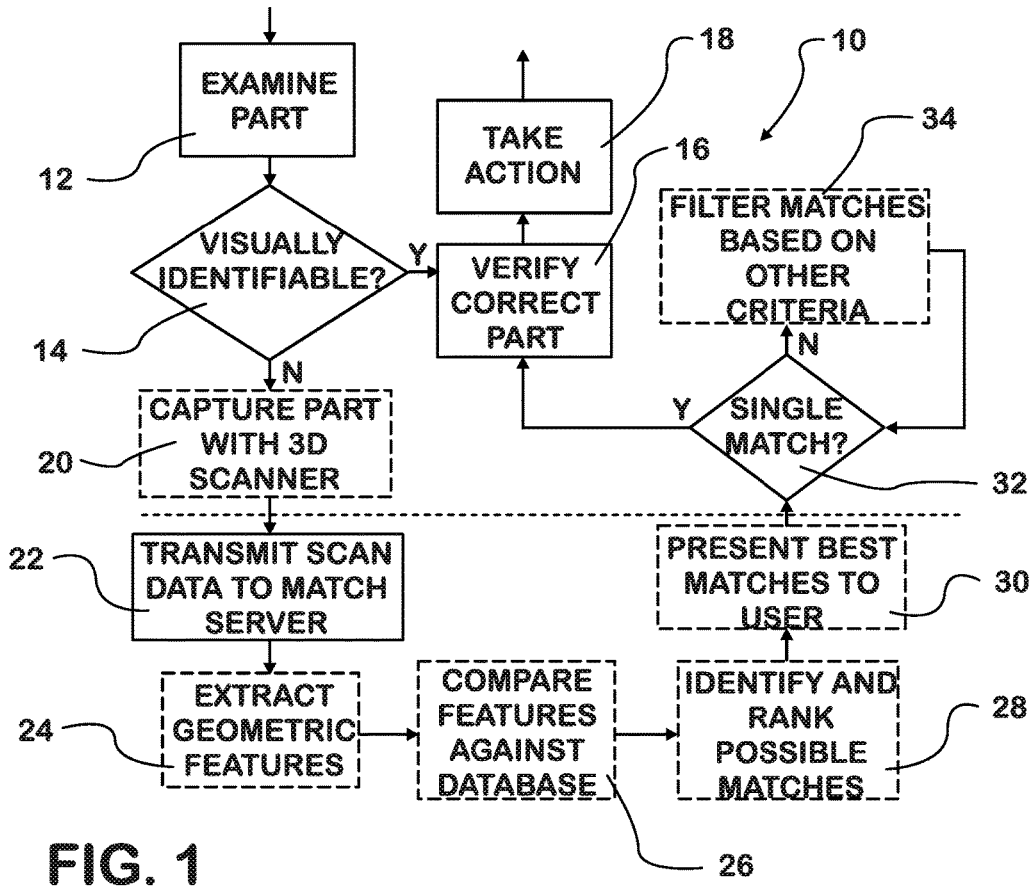
FIG. 1 presents a system level logic flow diagram used by the computerized system and method of the present invention.

Turning to FIG. 1, there is illustrated therein a low level system level logic flow diagram 10 wherein a user has a physical object (part) that he/she wishes to identify, e.g., for the purpose of replacement or re-ordering. Some parts may be easily identified by visual inspection 12 from information imprinted on the surface, prior experience, distinctive shape, size, etc. If such is present, and the part is visually identifiable 14, then one merely verifies that the part is correct 16, and takes action, ordering the proper part at 18. However, many are not readily identifiable, perhaps due to uncommon brand, outdated product, damaged/dirty condition, or unfamiliarity. In such a case, the user captures the part parameters with a 3D scanning device at 20. The resulting scan data is transmitted at 22 to a computerized recognition system that resides either locally or on a remote network.

The data is then processed to extract a profile consisting of geometric and photometric descriptors 24 suitable for part identification. The computerized recognition system compares this profile against a corresponding database 26 of previously acquired profiles, eliminates very unlikely matches 28, and ranks surviving candidates according to match likelihood. The associated identifiers (e.g., part numbers) for the best matches, along with their likelihoods, are returned and presented to the user via graphical display 30.

If the system logic 10 returns a single match at 32, the part is verified at step 16 and ordered at step 18. If the logic 10 returns more than one match at 32, then the user can interactively filter the results at 34 via the display based on manually-entered attributes and based on visual comparison of the physical part with images, 3d models, and textual descriptions of the candidates. Finally, when the candidate list has been narrowed to a single matching part at 32, the user verifies the correct part at 16 and can act on the resulting identifier, for example, order a replacement directly from the catalog website at 18.

Figure 2:
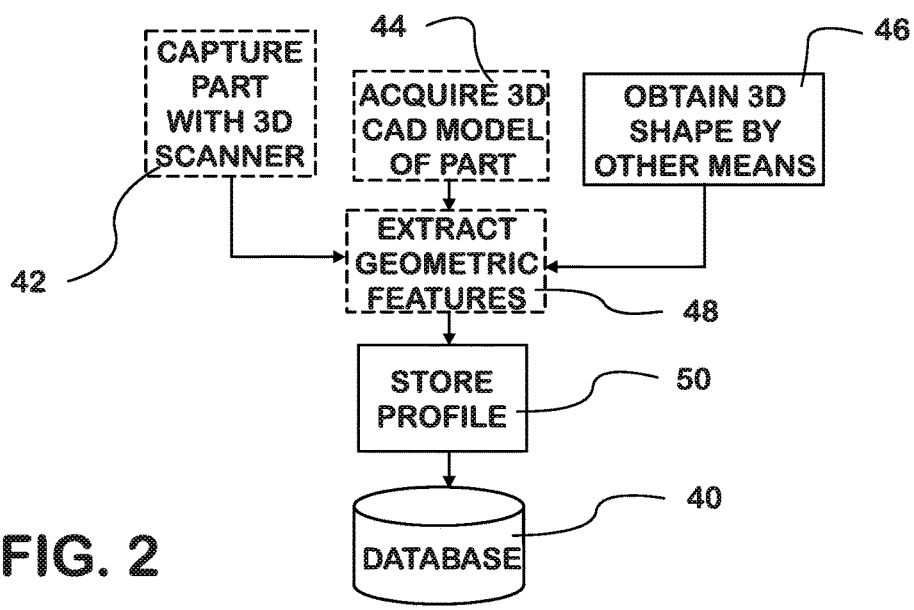
FIG. 2 presents a logic flow diagram for creation of a database of particular parts.

Turning now to FIG. 2, the corresponding database 40 of the computerized system 10 used to recognize the particular part is created offline, and contains a set of part identifiers, such as, for example, for a plumbing valve and may be captured by any suitable means such as those at steps 42, 44 or 46. Associated with each identifier is created a geometric and photometric profile 48 compatible with that extracted from the scanned part, as well as other information such as photographs, textual descriptions, and human-readable attributes that can be used for manual filtering by the user. The database may be populated by scanning physical objects, or by other means such as acquiring CAD models from manufacturers. Profiles are then stored at 50 to the database 40 and are derived from the initial 3d representation in the same manner as from the user-scanned part. Definitions of terms used herein are listed below for ease of comprehension:

part: a specific physical object with [mostly] rigid 3d shape; for instance, a faucet stem or mounting bracket.

user: the operator of the system; for instance, a retail store employee wishing to identify a part, or a consumer wishing to find a replacement.

scanner: a device that can create a digital 3d model of a presented object by measuring distance and appearance, e.g., using cameras, projectors, and/or lasers.

features: attributes of an object such as local and global 3d shape, physical dimensions, and visual appearance represented as a series of numeric values.

profile: a digital representation of an object that encodes one or more features.

identifier: a unique name or tag uniquely identifying a particular part, such as a product number or SKU.

database: a digital catalog or repository of parts, along with their identifiers and profiles, that can be queried according to various attributes.

match: a correspondence between the user-scanned part and a candidate from the database.

likelihood: a score or probability that a particular match is correct, or a degree of similarity between the query and the match.

recognition: the search for and retrieval of the most likely matches for a particular part from a database, as well as the likelihood of each match.

query: a particular part instance that the user wishes the system to recognize.

The system distinguishes itself from competition and prior art in a number of ways, some of which are denoted at present in FIGS. 1 and 2. Foremost among these is the use of 3D information at all stages, including database creation, part query, part matching, and user interaction. While other methods may share similar overall logic structure, they rely solely on digital images instead, which are inherently 2D projections of an object's true 3D shape.

Particular items of note:

(1) A digital 3D representation of the query part is acquired (e.g., via turntable scanner or mobile device) and used for matching by the system against the database information stored in memory. This representation captures the part's true size and shape in real-world units. Other methods acquire 2d images only.

(2) The recognition system operates using 3D data, producing geometric shape-based (and optionally appearance-based) features that directly encode local surface structure independent of environment and imaging conditions. Other methods exclusively use appearance-based features, which are derived from 2d image projections and thus (a) have no notion of true scale; (b) have no notion of "depth" or 3d surface structure; and (c) are affected dramatically by illumination, shadows, camera settings, viewpoint, and environment.

(3) Results are presented to the user in a multitude of formats that consist of traditional images and text annotations (these are the only formats returned by other methods), but additionally present rotatably viewable 3d models stored in the database.

(4) Retrieving 3D models, and encoding their true dimensions, allow the user to further narrow the search results via interactive inspection (e.g., manipulating the candidate models in a 3D viewer) and via manual data entry (e.g., specifying part length and diameter). Other methods allow only for visual inspection of static images and textual descriptions.

(5) As with queries, models acquired for database generation are also inherently 3D. This allows alternate "virtual" or "ideal" sources such as CAD files to populate the database without needing to obtain physical parts. Furthermore, only a single (partial or complete) scan suffices to represent each part. Other methods require imaging physical parts, and often involve dozens or hundreds of examples for training.

(6) Also as with queries, the system extracts geometric shape-based (and optionally appearance-based) features when populating the database. These features are highly commensurate with those extracted for queries because they rely on exactly the same underlying geometry. With image-based methods, matching query to database information is substantially more difficult and requires much more extensive imaging of each part in order to sufficiently capture expected variations in size, viewpoint, and illumination.

Figure 3:
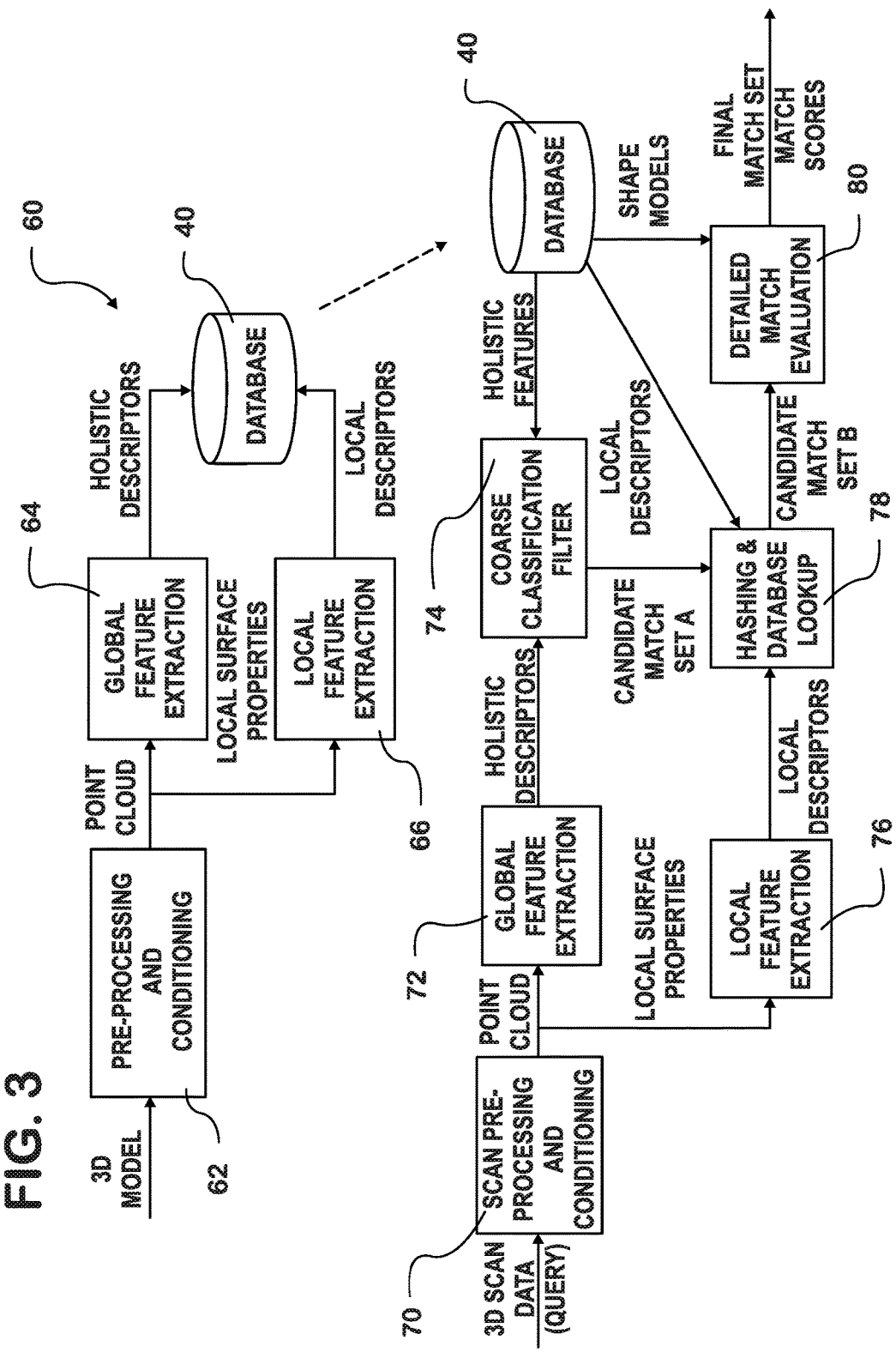
FIG. 3 presents a logic flow diagram of database creation in connection with a part matching process of the present invention.

Turning now to FIG. 3, the figure depicts the computerized process 60 for (a) database creation and its use in (b) matching in more detail. In both pipelines, the input data is pre-processed at 62 to properly scale and orient the part, and to create a low-level representation (e.g., 3d point cloud and differential orientation at each point); also in both pipelines, these low-level representations are used to extract both global features at 64 and local features at 66. Global or holistic features describe the entire part and provide compact, coarse characteristics such as overall shape and dimensions, while local features encode finer shape detail localized to small regions on the part's surface, with both being stored in database 40. All features are indexed via efficient hashing and either stored to the database 40 or used to query the database 40.

The recognition process begins by considering all possible database models for a particular query at 70 and then applies a sequence of progressively more complex (and more selective) filters. The first of these filters, global feature extraction 72, consider only holistic query descriptors, providing a coarse classification at 74 that can be compared very quickly to those in the database 40 so as to immediately eliminate most possible candidates, resulting in set A. Next, local descriptors 76 extracted from the query part are hashed at 78 and used to efficiently scan the database's feature index, further reducing possible matches to set B. Finally, the system evaluates each surviving candidate in greater detail at 80 to determine its complete surface-to-surface similarity to the query; this process produces the final list of candidates, along with similarity scores that can be used for ranking and user presentation.

Figure 4:
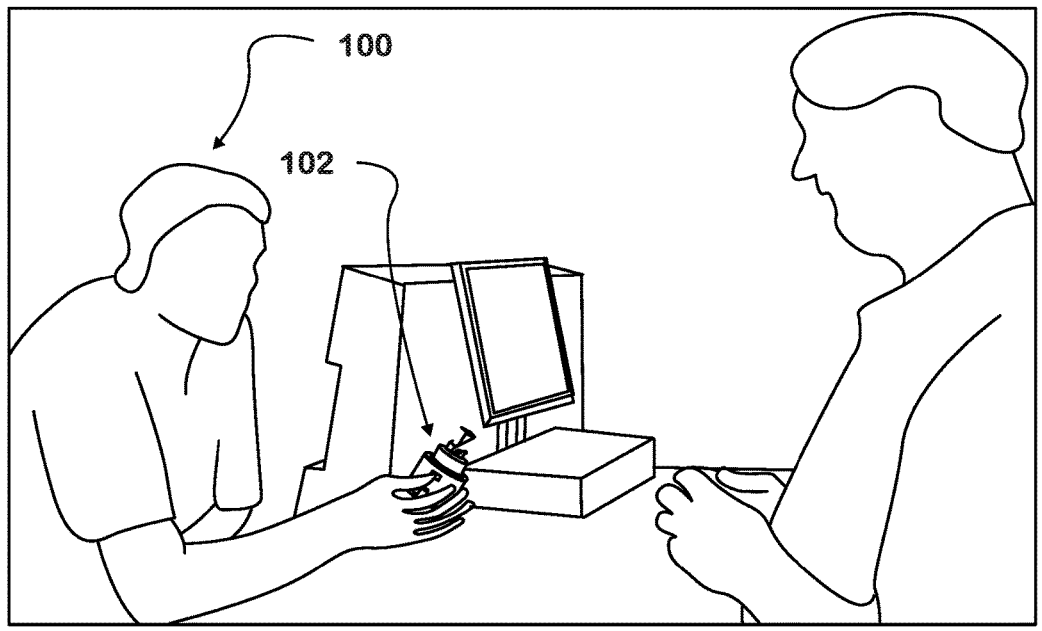
FIG. 4 shows a customer bringing in a part for identification by the system and method of the present invention, in this example a plumbing cartridge.

FIG. 4 shows a customer 100 bringing in a part 102 for identification by the system and method of the present invention, in this example a plumbing cartridge 102. Although the example throughout deals with a plumbing part this should not be construed as limiting inasmuch as the method and system may be used in any other field where repair/replacement parts are required, such as for example in the automotive part industry, etc.

Figure 5:
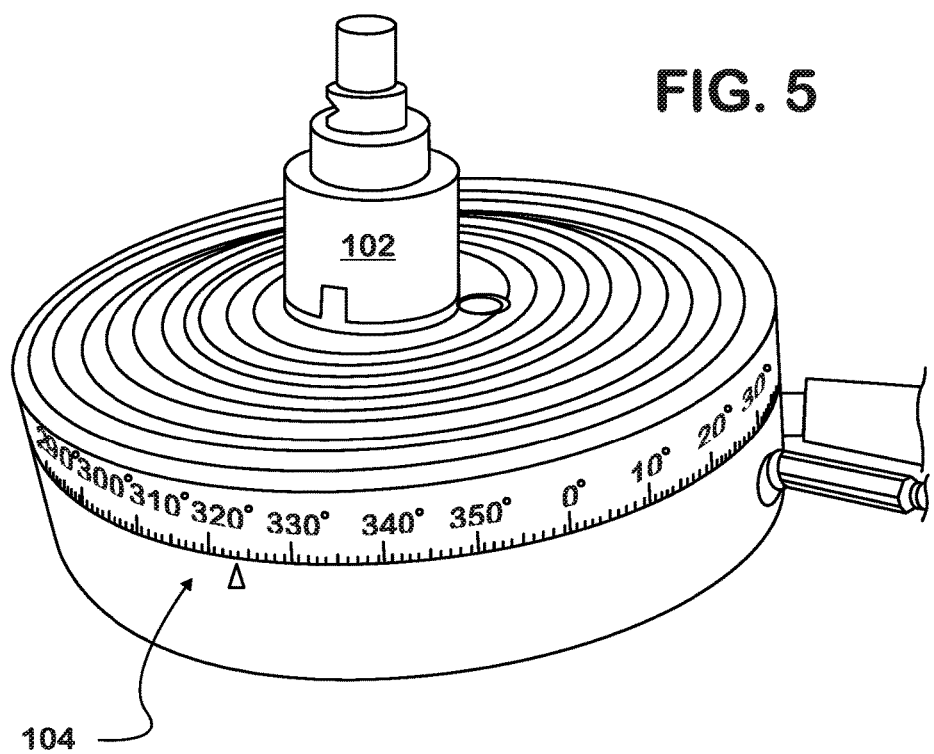
FIG. 5 shows the cartridge of FIG. 4 being placed on a turntable for scanning and identification.

FIG. 5 shows the part 102, in the form of the cartridge 102 of FIG. 4, being placed on a turntable 104 for 3D scanning and identification by the system and method of the present invention.

Figure 6:
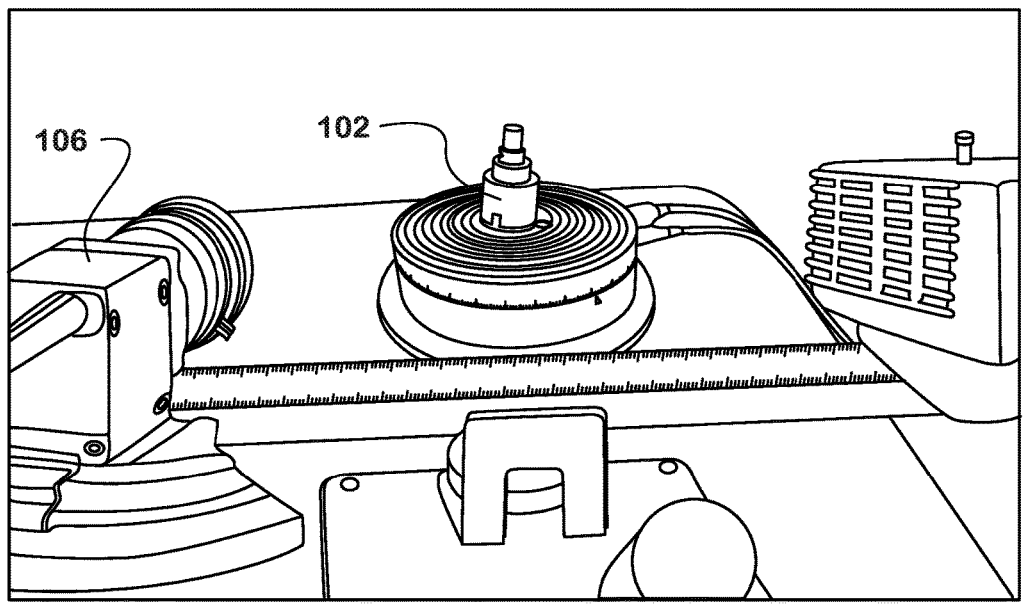
FIG. 6 shows the cartridge being scanned by a countertop 3D scanner, as an example, creating a 3D point cloud model.

FIG. 6 shows the cartridge 102 being scanned by a countertop 3D scanner 106, as an example, creating a 3D point cloud model of same. Although a countertop scanner is exemplified this should not be construed as limiting inasmuch as any electronic device capable of capturing a 3D image could be used, even a future cellular phone with 3D imaging capability.

Figure 7:
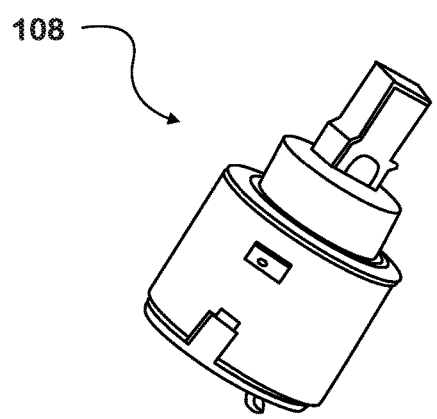
FIG. 7 shows the 3D point cloud model created by the scan of the part and the model is compared to all the cartridge models and their parameters stored in the system database.

FIG. 7 shows the 3D point cloud model 108 created by the scan of the part and the model and its parameters are compared to all the cartridge models and their parameters stored in the particular plumbing cartridge database 40 created for the system and stored at 50 in the memory thereof. Again, this should not be construed as limiting to the versatility of the system and method.

Figure 8:
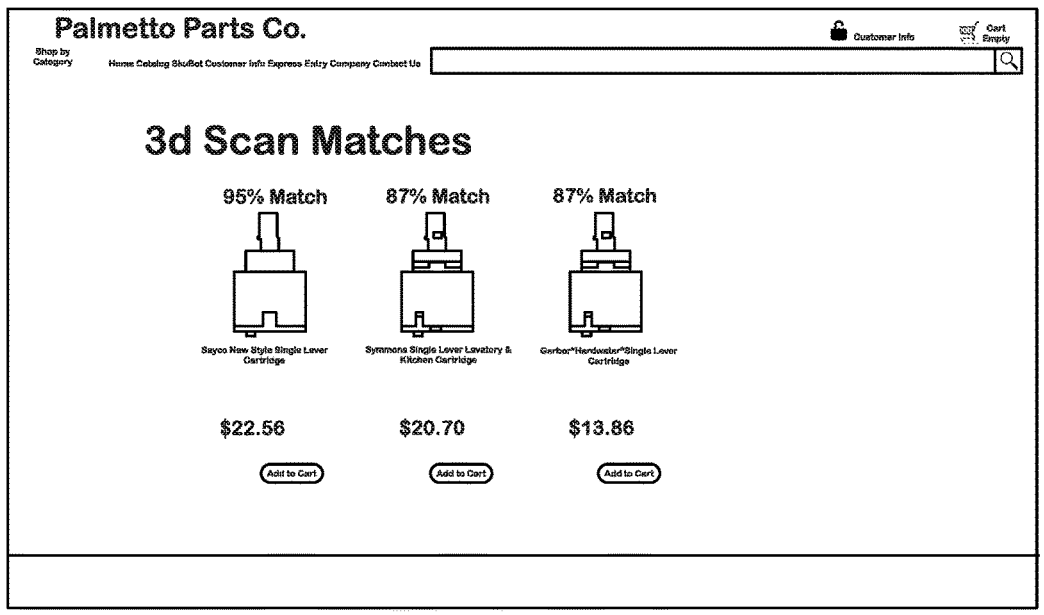
FIG. 8 shows a screenshot of potential matching parts retrieved from the system, in order of match percentage.

FIG. 8 shows a screenshot 110 of potential matching parts retrieved from a search through the database 40 in the system memory, preferably, in the preferred embodiment, ranking down from the highest match percentage.

Figure 9:
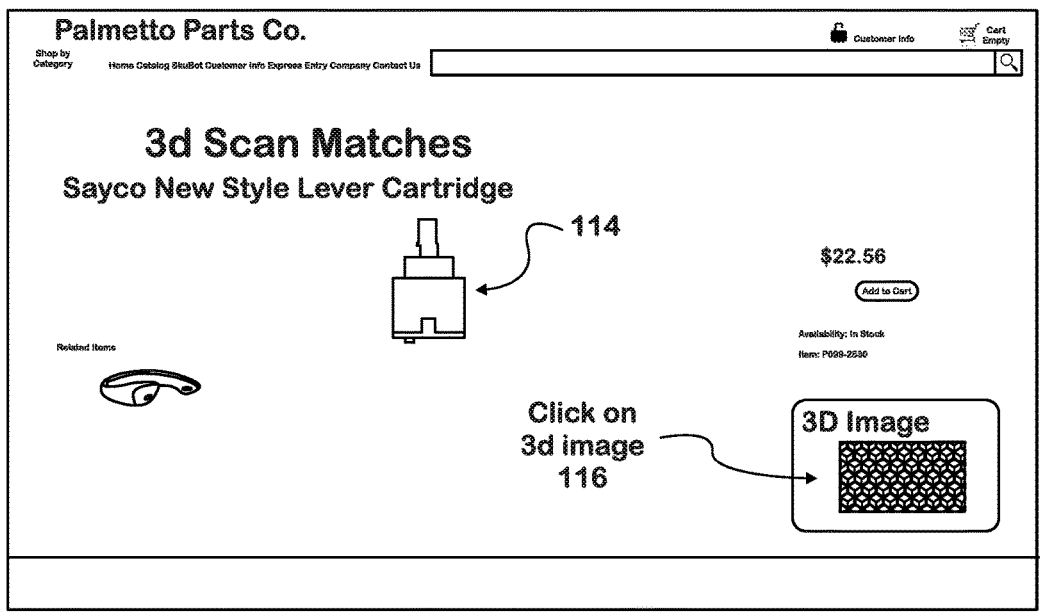
FIG. 9 shows a screenshot of the highest ranking part selected and shows a button for visualization in all dimensions, if desired.

FIG. 9 shows a screenshot 112 of the highest ranking part 114 selected and shows a link button 116 for use in presenting rotatable visualization in all dimensions, if desired.

Figure 10:
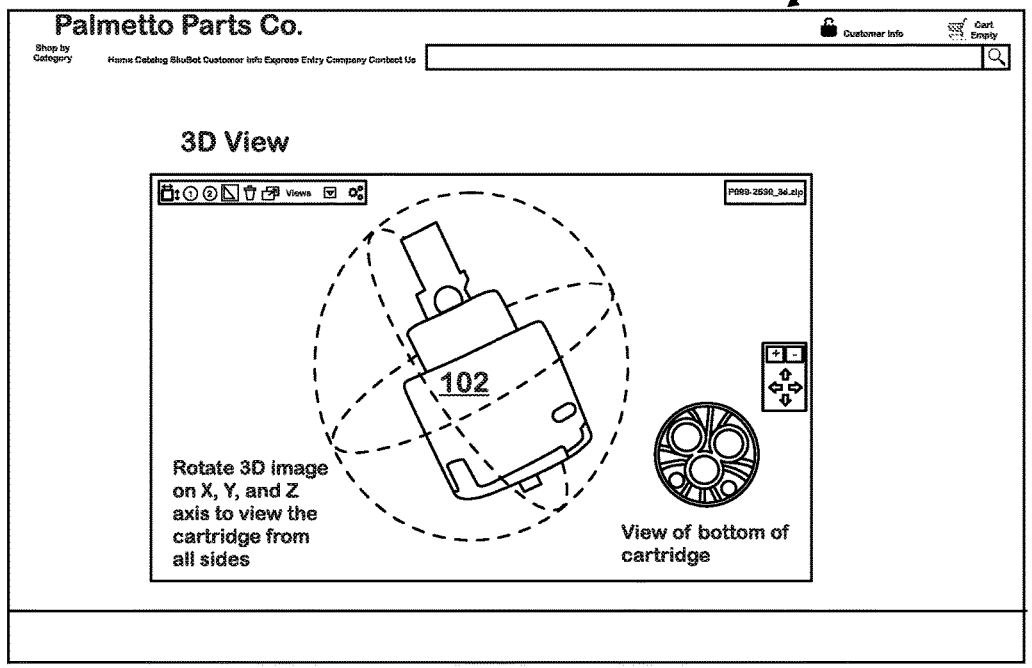
FIG. 10 shows what appears when the button of FIG. 9 is activated.

FIG. 10 shows what appears in the next screenshot 118 when the link button 116 of FIG. 9 is activated to provide rotatability to the view of the part 102.

Figure 11:
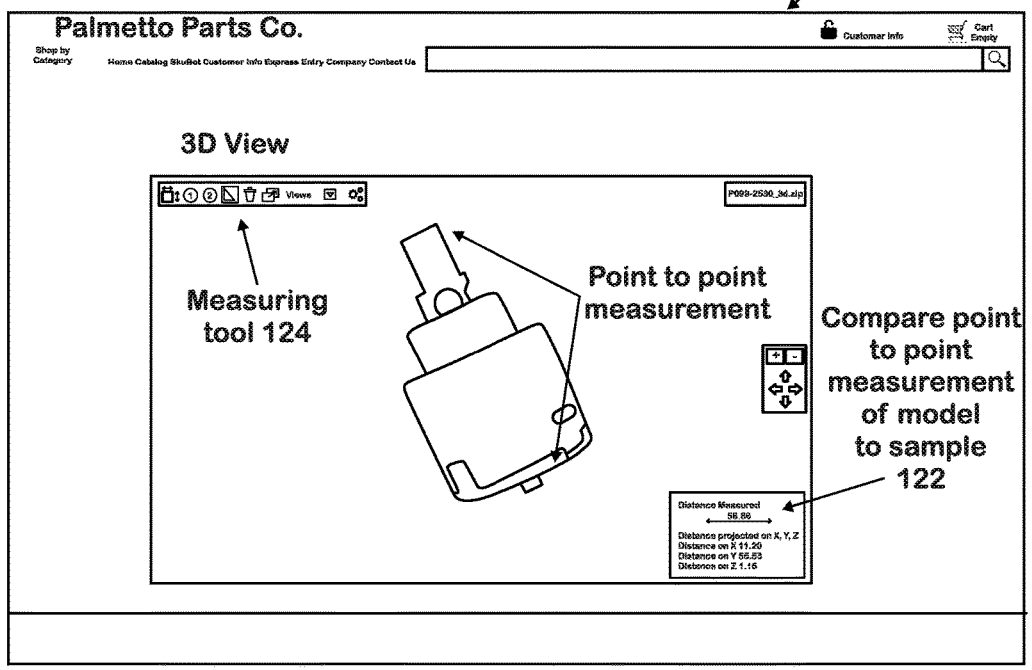
FIG. 11 shows activation of a measuring tool of the system which brings up point to point measurements for comparison with the actual part.

FIG. 11 shows a screenshot 120 including point to point measurements 122 which may be elicited from the system and method upon activation of a measuring tool 124 of the system which brings up a point to point measurement table 122 of measurements along each axis for comparison with the dimensions of the actual part 102.

Figure 12:
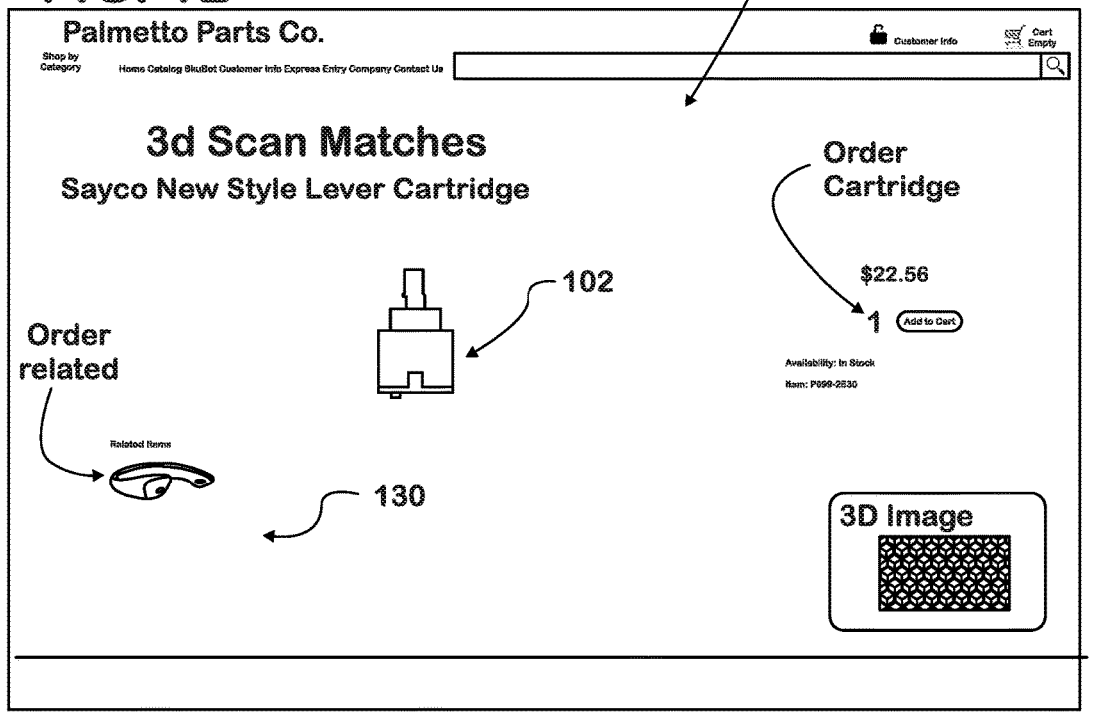
FIG. 12 shows a screenshot of an order page for the correct part, which also provides a list of related parts which may also potentially be needed.

FIG. 12 shows a screenshot 128 of an order page for the selected, highest ranking part 102, which order page may also provide a list of related parts 130 which may also potentially be needed.

As described above, the system and method of the present invention provide a number of advantages, some of which have been described above and others of which are inherent in the invention.

Also, modifications may be proposed without departing from the teachings herein. For example, although the description deals with repair and/or replacement parts, the system and method may be used in identification of new parts as well. Accordingly, the scope of the invention is only to be limited as necessitated by the accompanying claims.

The invention claimed is:

1. A system for use in identifying a particular part not readily identifiable, by using 3D imaging, the system comprising:
   a computerized recognition system comprising a computer; a non-contact 3D scanning device, wherein the non-contact 3D scanning device is a structured light scanner, time-of-flight 3D scanner, depth camera, or mobile device comprising a depth camera and produces 3D point clouds or geometric 3D surfaces;
   means for the non-contact 3D scanning device to make a 3D model of the particular part not readily identifiable which provides a 3D imaging scan, along with geometric descriptors and parameters, of the particular part not readily identifiable to be identified from information in a database within the computerized recognition system;
   the database within the computerized recognition system comprising profiles comprising 3D imaging scans, associated identifying information, geometric descriptors, and parameters for models of readily identifiable parts;
   means for the computer accessing the database within the computerized recognition system, the computer being programmed to assess the profiles against the 3D image and parameters from the non-contact 3D imaging device of the particular part not readily identifiable and compile a number of candidate database part matches that match the particular part not readily identifiable;
   means for the computer to filter the profiles of the 3D imaging scans of models of the readily identifiable parts, the computer being programmed to compare the 3D imaging scan of the particular part not readily identifiable to the database and filter profiles in the database, the filter comprising a first global feature extraction, considering only holistic query descriptors and providing a coarse classification that is compared to the profiles in the database to reduce the number of candidate database part matches, a second filter wherein local descriptors extracted from a query are hashed and used to scan a feature index, further reducing possible matches and a third filter wherein surface-to-surface similarity is compared to that of the query producing a final list of candidate database part matches, along with similarity scores used for ranking and presentation;
   means for the non-contact 3D scanning device to communicate with the computer and its database, the computer providing the profile of the readily identifying part to a user of the non-contact 3D scanning device for at least one model of the particular part not readily identifiable that fits the parameters of the particular part not readily identifiable scanned by the non-contact 3D scanning device; and
   the computer being programmed to interactively filter the profiles available in the associated database by inputting parameters for physical attributes of the particular part not readily identifiable, wherein the physical attributes comprise textual descriptions or geometric descriptors.

2. The system of claim 1 wherein the database includes not only 3D scans or images but also associated feature representations, including but not limited to:
   part measurements, dimensions, or local or global geometric surface shape descriptors, which are stored as digital profiles.

3. The system of claim 1 wherein the database can be populated by scanning physical parts, or by obtaining and inputting 3D computer-aided design drawings.

4. A method for identifying a particular part not readily identifiable, by using 3D imaging, using a computerized system comprising:
   a non-contact 3D scanning device comprising a means for producing a 3D imaging scan of the particular part not readily identifiable to be identified from information in a database, wherein the non-contact 3D imaging device is a structured light, time-of-flight 3D scanner, depth camera or mobile device comprising a depth camera that produces 3D point clouds or geometric 3D surfaces;
   a computer;
   the database comprising profiles for models of readily identifiable parts, profiles comprising 3D imaging scans, identifying information, geometric descriptors, and parameters for readily identifiable parts;
   the computer comprising means for accessing a computerized recognition system that stores and allows access to the database and being programmed to assess profiles stored in the database against a 3D image and parameters from the non-contact 3D scanning device via a series of one or more holistic, hierarchical, and/or feature-based filters that operate on extracted profiles, filters comprising a first global feature extraction, considering only holistic query descriptors and providing a coarse classification that is compared to the profiles in the database to reduce a number of candidate database part matches, a second filter wherein local descriptors extracted from a query are hashed and used to scan a feature index, further reducing candidate database part matches and a third filter wherein surface-to-surface similarity is compared to that of the query producing a final list of candidate database part matches, along with similarity scores used for ranking and presentation;
a communication network between the non-contact 3D scanning device and the computer, the computer being programmed to compare the 3D image received from the non-contact 3D scanning device to the profiles in the database and provides information to a user of the non-contact 3D scanning device for at least one candidate database part match which fits the parameters of the particular part not readily identifiable scanned by the non-contact 3D imaging device, the method comprising the steps of:
creating the 3D image of the particular part not readily identifiable using the non-contact 3D scanning device;
using the computer to assess or compare the 3D image of the particular part not readily identifiable provided from the non-contact 3D scanning device to the database;
using the communication network to send the 3D image of the particular part not readily identifiable to the computer for comparison to the profiles in the database;
providing at least one candidate database part match which fits the parameters of the particular part not readily identifiable scanned by the non-contact 3D scanning device; and
using the filters to interactively filter the profiles in the database by inputting parameters for physical attributes of the particular part not readily identifiable, wherein the physical attributes comprise textual descriptions or geometric descriptors.

5. The method of claim 4 wherein the non-contact 3D scanning device comprises sensors or scanners used to scan parts that need to be identified, producing measurements in real-world scale units, and extracting digital profiles commensurate with profiles stored in the database.

6. The method of claim 5 wherein scanned part information is transmitted to the computer and compared as a query profile to information stored in the database to identify most likely candidate database part matches.

7. The method of claim 5, wherein the candidate database part matches are ranked based on similarity to the query.

8. The method of claim 7 wherein resulting ranked candidate database part matches are provided to the user, along with images, text descriptions, pricing, and other associated database information.

9. The method of claim 5 wherein the computer can also dispatch results to a 3rd party inventory management website or software service.

* * * * *